（12）United States Patent
Auerbach et al.

(10) Patent No.: US 8,773,804 B2
(45) Date of Patent: Jul. 8, 2014

(54) DISK DRIVE INTERNAL TEMPERATURE CONTROL SYSTEM

(75) Inventors: Daniel Auerbach, San Jose, CA (US); James G. Belleson, Hillsborough, CA (US); Brad V. Johnson, Santa Clara, CA (US)

(73) Assignee: HGST Netherlands B.V., Amsterdam (NL)

( * ) Notice: Subject to any disclaimer, the term of this patent is extended or adjusted under 35 U.S.C. 154(b) by 1031 days.

(21) Appl. No.: 11/329,591

(22) Filed: Jan. 10, 2006

(65) Prior Publication Data

US 2008/0130166 A1 Jun. 5, 2008

(51) Int. Cl.
*G11B 19/02* (2006.01)
*G11B 33/14* (2006.01)

(52) U.S. Cl.
USPC .......................................... 360/69; 360/97.12

(58) Field of Classification Search
None
See application file for complete search history.

(56) References Cited

U.S. PATENT DOCUMENTS

| 4,642,715 | A | 2/1987 | Ende |
| 4,685,303 | A | 8/1987 | Branc et al. |
| 5,414,591 | A | 5/1995 | Kimura et al. |
| 5,704,212 | A | 1/1998 | Erler et al. |
| 5,827,424 | A | 10/1998 | Gillis et al. |
| 5,927,386 | A | 7/1999 | Lin |
| 6,115,251 | A | 9/2000 | Patel et al. |
| 6,144,553 | A | 11/2000 | Hileman et al. |
| 6,191,943 | B1 | 2/2001 | Tracy |
| 6,233,148 | B1 | 5/2001 | Shen |
| 6,289,678 | B1 | 9/2001 | Pandolfi |
| 6,385,007 | B1 * | 5/2002 | Li .............................. 360/97.02 |
| 6,434,000 | B1 * | 8/2002 | Pandolfi ........................ 361/685 |
| 6,480,380 | B1 | 11/2002 | French et al. |
| 6,563,704 | B2 | 5/2003 | Grouell et al. |
| 6,735,035 | B1 * | 5/2004 | Smith et al. ...................... 360/69 |
| 7,035,031 | B2 * | 4/2006 | Kim et al. ........................ 360/69 |
| 7,145,463 | B2 * | 12/2006 | Olsen ............................ 340/585 |
| 2002/0030981 | A1 | 3/2002 | Sullivan et al. |
| 2002/0114095 | A1 * | 8/2002 | Katahara et al. ................. 360/53 |
| 2003/0081128 | A1 * | 5/2003 | Kirmuss ................... 348/207.99 |
| 2003/0142439 | A1 * | 7/2003 | Hidaka et al. .............. 360/97.02 |
| 2003/0202274 | A1 * | 10/2003 | Onda et al. ....................... 360/69 |
| 2006/0232891 | A1 * | 10/2006 | Bushnik et al. ............. 360/265.6 |
| 2007/0017685 | A1 * | 1/2007 | Moore et al. .............. 174/17 VA |

* cited by examiner

*Primary Examiner* — Andrew L Sniezek

(57) ABSTRACT

A disk drive internal temperature control system is disclosed. The internal temperature control system includes a disk drive temperature monitor for determining a temperature of the disk drive and for providing a measure of the temperature of the disk drive and a disk drive temperature manager for managing the temperature of the disk drive based on the measure of the temperature of the disk drive. A temperature control component controls the temperature of the disk drive.

21 Claims, 5 Drawing Sheets

DISK DRIVE INTERNAL TEMPERATURE CONTROL SYSTEM

FIELD OF THE INVENTION

Embodiments of the present invention relate generally to disk drive systems. In particular, embodiments of the present invention relate to disk drive temperature control.

BACKGROUND OF THE INVENTION

Hard disk drive (HDD) based storage technologies are currently finding use in an increasingly diverse range of technological applications. This includes conventional consumer electronic devices such as digital music players, digital cameras, movie devices and advanced technology cell phones. Moreover, HDD based products are also being introduced into the automotive realm, where both in car and under the hood applications are being considered. In car applications include the provision of support for entertainment, navigation and communications systems. Under the hood uses include data storage systems for storing engine operating history.

One of the challenges that HDD systems encounter is a requirement that their environmental operation range far exceed that found in the office-like environment that most information technology (IT) based HDDs are operated in. For example, typical prior art HDDs have a specified operating temperature range of 5 C to 60 C with relatively benign rates of change. However, auto manufacturers would like to use HDD's capable of operating to at least −40 to 80 C with the capacity to manage very aggressive rates of temperature change. Under hood use may demand even more extreme requirements.

Conventional HDD's are challenged to meet these requirements in several critical areas. Component lubrication is one such area. Lubricants are used in several places throughout the HDD structure including the spindle motor system, actuator pivot system and head-to-disk interface. Unfortunately, the lubricants currently in widespread use are not capable of acceptable operation at extreme temperatures. More specifically, lubricant viscosity increases at very low temperatures while evaporation/degradation is encountered at high temperatures.

Moreover, water vapor condensation that can form inside conventional HDD's is also a significant problem. It should be appreciated that water droplets that can result from such condensation and that can occur at the head-to-disk interface can be fatal to the device.

Modern HDD's typically utilize a fluid bearing based spindle motor system to rotate the disks. It should be noted that this very sensitive technology can be adversely affected by temperature extremes in several ways. Specifically, clearance changes due to thermal expansion and contraction can render bearings useless at temperature extremes because the mechanical clearances in the bearing system are only several microns wide to begin with. Moreover, thermally induced tilts that can result from the expansion and contraction of motor materials can cause track mis-registration to a degree that is greater than the HDD can tolerate. In addition, HDD motors are limited by the lubrication issues discussed above.

Changes have been proposed to make conventional HDD systems capable of managing automobile like temperature conditions. It should be noted that the existing proposals are expensive and difficult to implement. More specifically, the development of new lubricant systems is both expensive and difficult to implement. Hermetically sealed HDDs have been proposed that would partially ruggedized the devices, but as with the other proposals this solution requires significant development and adds cost. The electronics modules for a HDD can be ruggedized to achieve the required temperature demands but significant cost is added.

SUMMARY OF THE INVENTION

Accordingly, a need exists for a low cost technology that can be easily implemented that allows existing hard disk drive technology to meet new temperature demands. The present invention provides a method that accomplishes the above-mentioned need.

For instance, one embodiment of the present invention provides a disk drive internal temperature control system. The internal temperature control system includes a disk drive temperature monitor for determining the temperature of the disk drive and for providing a measure of the temperature of the disk drive and a disk drive temperature manager for managing the temperature of the disk drive based on the measure of the temperature of the disk drive. A temperature control component controls the temperature of the disk drive.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be appreciated that although the invention has been described herein in conjunction with hard disk drive (HDD) technology the invention can be used with any type of disk drive technology. In addition, embodiments of the invention can be used in conjunction with disk drives used in a variety of applications including but not limited to automotive, aerospace, and computer.

Figure 1:
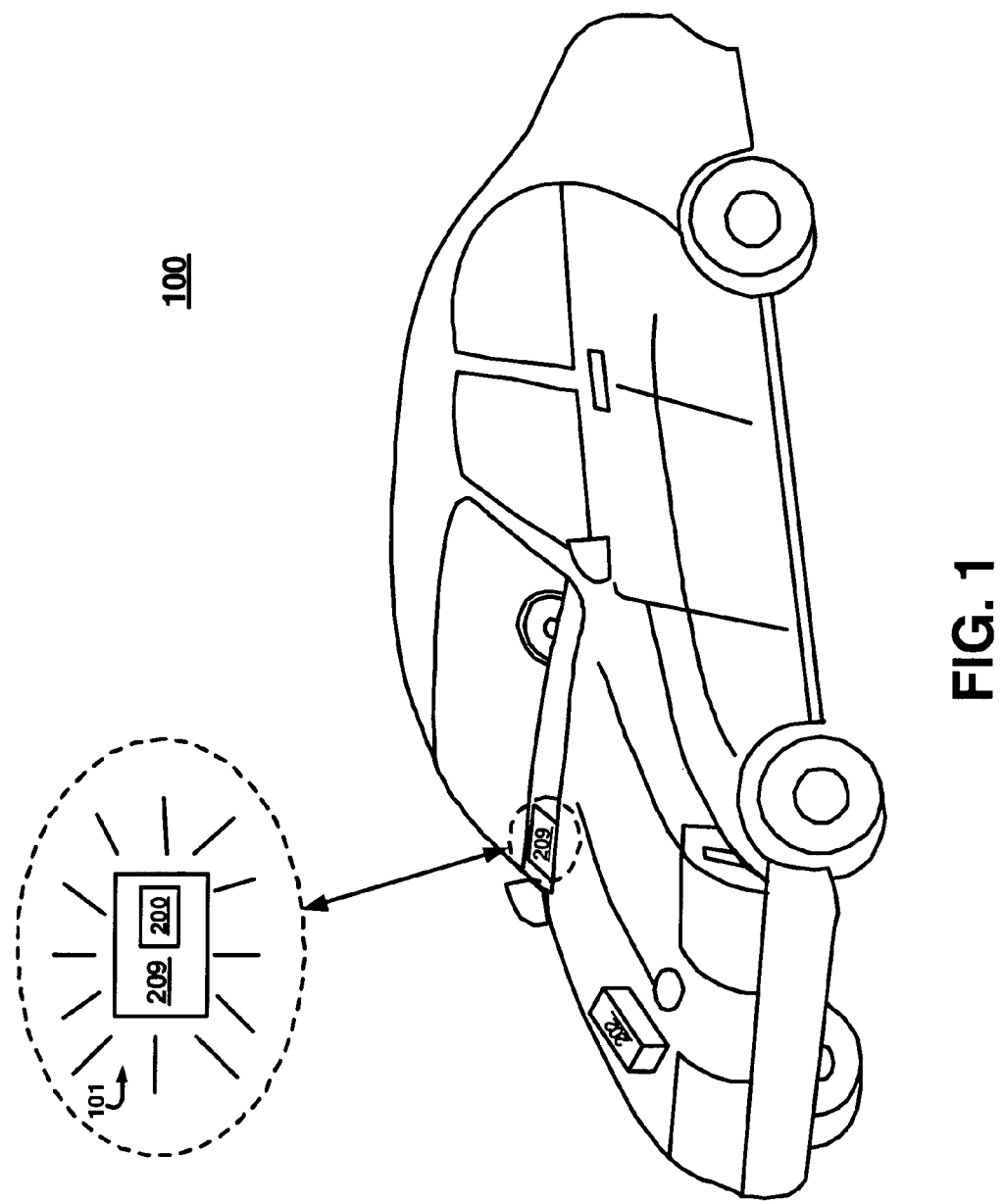
FIG. 1 shows a vehicle with an onboard hard disk drive (HDD) that has an internal temperature control system according to one embodiment of the present invention.

Disk Drive Internal Temperature Control System According to One Embodiment of the Present Invention FIG. 1 shows a vehicle 100 with an onboard hard disk drive (HDD) 209 that has an internal temperature control system 200 according to one embodiment of the present invention. In one embodiment, HDD temperature control system 200 has the capacity to maintain the temperature of HDD 209 within it's specified operating temperature range despite encountering extreme temperature conditions outside the specified operating temperature range of HDD 209. FIG. 1 shows vehicle 100, ambient temperature 101, power source 202, onboard HDD 209, HDD temperature control system 200.

It should be appreciated that the ambient temperature 101 of HDD 209 is associated with the temperature that is presented by the environment in which vehicle 100 is located. As such, the temperature of the environment in which vehicle 100 is located affects the temperature of all components of vehicle 100 including any onboard components such as HDD 209. Vehicles such as automobiles may be subjected to a wide range of temperatures because of their use in a wide variety of environments that may present a wide range of temperature conditions.

It should be appreciated that the proper function of onboard HDD 209 may be affected by environments that present extreme temperature (hot or cold) conditions. For example, lubricants that may be used in association with various components of hard disk drive 209 may not be effective at extreme temperatures. Moreover, condensation inside HDD 209 and the thermal contraction and expansion of HDD 209 mechanical components (caused by the extreme temperature conditions) can present challenges to the devices proper function.

In one embodiment when vehicle 100 is subjected to environmental temperatures that are sufficient to raise or lower the temperature of HDD 209 above or below a specified temperature (or range of temperatures) within the specified operating temperature range (high or low) of HDD 209, temperature control system 200 will act to maintain the temperature of the HDD 209 at the specified temperature (or range of temperature) within the specified operating temperature range. In one embodiment this may be effected through the addition or the removal of sufficient amounts of heat to keep the temperature of hard disk device at the specified temperature (or range of temperatures) within the specified operating temperature range.

The addition or the removal of heat to either maintain or to effect an adjustment of the temperature of the HDD 209 may be accomplished in a variety of ways (discussed below with reference to FIG. 2A). This function of the HDD temperature control system 200 serves to maintain the temperature of HDD 209 in an operating temperature range that avoids the problems discussed above.

HDD temperature control system 200 provides hard disk drive 209 with the internal capacity to regulate its temperature within the specified operating temperature range of hard disk drive 209 by taking advantage of a continuously available power source 202 such as the battery power available in an automobile (see FIG. 1). In one embodiment HDD 209 may draw small amounts of battery power to regulate its temperature when required much like an automotive digital clock does to maintain the correct time even when the car is not in operation.

In one embodiment, HDD 209 may also be insulated on the exterior with commercially available insulation materials to reduce the power consumption associated with heating and cooling operations or to further extend the specified operating temperature range. In one embodiment, insulating materials may be attached to exterior surfaces of HDD 209 via adhesive stray-coated material. In another embodiment, HDD 209 may be placed in an insulating shell composed of molded material. In other embodiments, other types of insulation may be used.

Figure 2A:
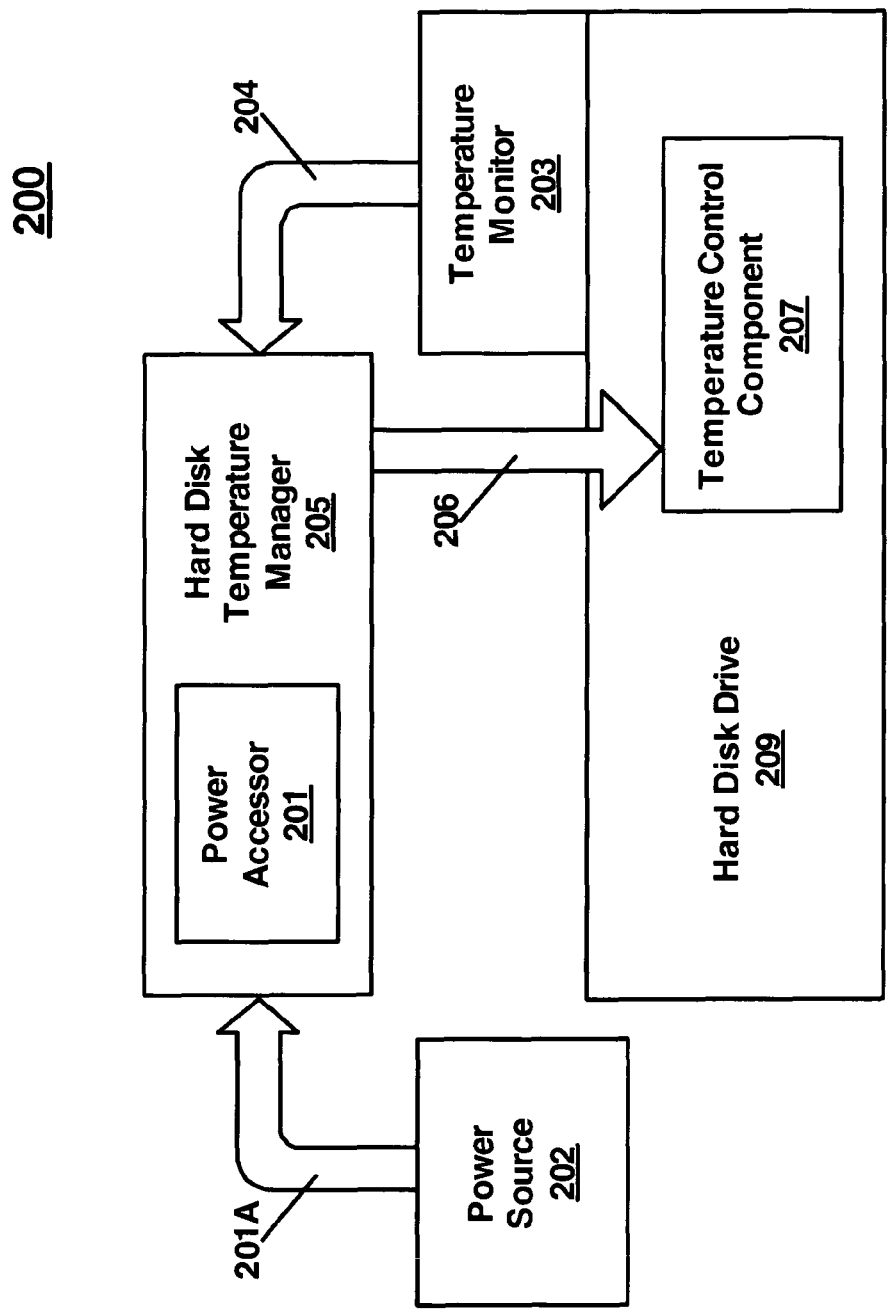
FIG. 2A shows a HDD internal temperature control system according to one embodiment of the present invention.

FIG. 2A shows a HDD temperature control system 200 according to one embodiment of the present invention. In the FIG. 2A embodiment, HDD temperature control system 200 includes power accessor 201, power source 202, HDD temperature monitor 203, HDD temperature manager 205, HDD temperature control component 207 and HDD 209.

Referring to FIG. 2A, power accessor 201 continuously accesses power 201A from a continuously available power source (e.g., battery etc.). The power that is accessed may be used to power HDD temperature manager 205 and other components of HDD temperature control system 200. In one embodiment, power accessor 201 may be included as a part of the HDD temperature manager 205.

HDD temperature monitor 203 monitors the temperature of HDD 209. In addition, temperature monitor 203 generates a measure of the temperature 204 (or change in the temperature) of HDD 209. In one embodiment, HDD temperature monitor 203 responds to the temperature (or changes in the temperature) of HDD 209 by generating signals/data (e.g., 204) that reflect the temperature (or changes in the temperature) of HDD 209.

In one embodiment, the measure of the temperature 204 (or change in temperature) of HDD 209 that is generated by HDD temperature monitor 203 may be accessed by HDD temperature manager 205.

In one embodiment, HDD temperature monitor 203 may be physically coupled to HDD 209 as shown in FIG. 2A. In an alternate embodiment, HDD temperature monitor 203 or components thereof may be physically separated from HDD 209. In one embodiment, HDD temperature monitor 203 may be implemented as an integrated circuit (IC) based temperature sensor. In alternate embodiments other suitable temperature sensing mechanisms may be employed.

HDD temperature manager 205 manages the temperature of (the addition or removal of heat to/from) HDD 209 based on an accessed measure of the temperature 204 (or change in temperature) of HDD 209. In one embodiment, HDD temperature manager 205 may access the measure of the temperature 204 (or change in temperature) of HDD 209 from HDD temperature monitor 203. Based on the measure of the temperature 204 (or change in temperature) of HDD 209 that is accessed, HDD temperature manager 205 may act to maintain, raise or lower the temperature of HDD 209.

In one embodiment, this can be accomplished by adjusting, maintaining or eliminating existing current 206 levels supplied to various components of HDD 209 or by adjusting, maintaining or eliminating the current 206 that is supplied to a temperature controlling component (e.g., 207) associated with HDD 209.

Figure 2B:
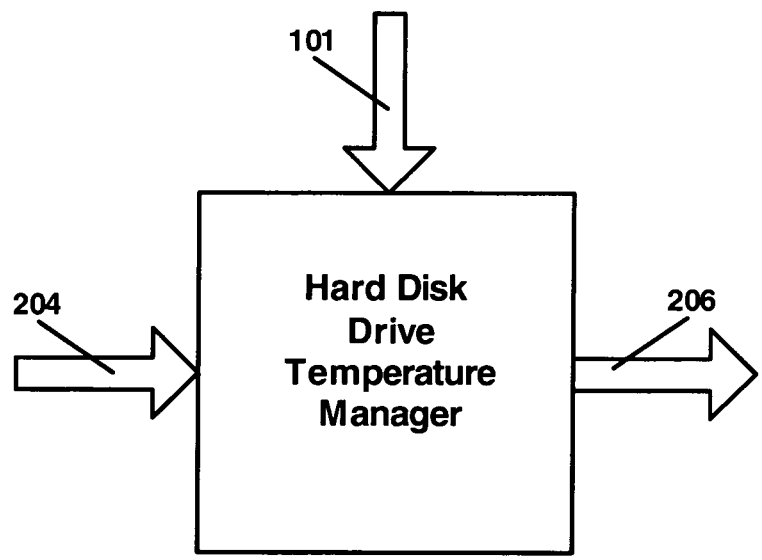
FIG. 2B shows inputs to the HDD temperature manager of the hard disk drive internal temperature control system according to one embodiment of the present invention.
Figure 2C:
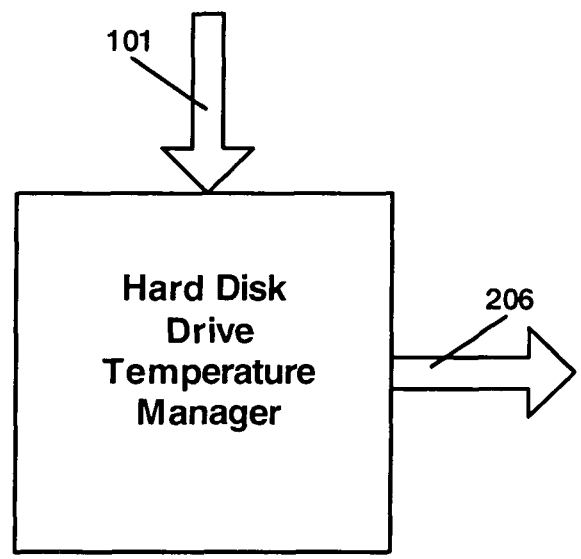
FIG. 2C shows inputs to the HDD temperature manager of the hard disk drive internal temperature control system according to one embodiment of the present invention.

In an alternate embodiment, HDD temperature manager 205 is configured to manage the temperature of HDD 209 based on measures of the temperature (or change in the temperature) of HDD 209 in addition to measures of the ambient temperature (e.g., 101 in FIG. 1) of HDD 209 as illustrated in FIG. 2B. In yet another embodiment, HDD temperature manager 205 is configured to manage the temperature of HDD 209 based solely on measures of the ambient temperature (e.g., 101 in FIG. 1) of the HDD 209 as illustrated in FIG. 2C.

In one embodiment, a user may manually select whether the temperature of HDD 209 is managed based on: (1) measures of the temperature or change in the temperature of HDD 209, (2) measures of the temperature or change in the temperature of HDD 209 in addition to measures of the ambient temperature of HDD 209 or (3) measures of the ambient temperature of HDD 209. In an alternate embodiment, the nature of the temperature management process may be predetermined or may be determined automatically.

In one embodiment, HDD temperature manager 205 may be implemented as a component attached to HDD 209. In an alternate embodiment, HDD temperature manager 205 or components thereof may be implemented using components that are physically separated from HDD 209. In one embodiment, HDD temperature manager 205 may be implemented as a thermostat. In alternate embodiments, other suitable temperature controlling mechanisms may be employed.

HDD temperature control component 207 adds or removes heat (or does not add or remove heat) to or from the physical structure of HDD 209 based on signals (e.g., 206) that are received (or not received) from HDD temperature manager 205. In one embodiment, in this manner the HDD temperature control component 207 is directed to maintain the temperature of HDD 209 within a specified operating temperature range.

For example, when the temperature of the HDD 209 is situated stably at a specified temperature (or range of temperatures) within the operating temperature range, the HDD temperature manager 205 may not prompt the temperature control component 207 to add or remove heat to or from HDD 209 so that the specified temperature (or range of temperatures) is maintained. By contrast, when the temperature of the HDD 209 rises above or falls below the specified temperature within the operating temperature range the HDD temperature manager 205 may prompt the temperature control component 207 to add or remove heat to or from HDD 209 in order to maintain the temperature of the HDD at the specified temperature (or range of temperatures) within the operating temperature range.

It should be appreciated that in one embodiment HDD temperature control component 207 or components thereof may be encompassed by components of HDD 209. In one embodiment, these components may be enlisted to function as the temperature control component 207 to maintain or adjust the temperature of HDD 209. For example, the current 206 level supplied to the spindle motor coils (not shown) or certain spindle motor coils and/or actuator coils of HDD 209 can be maintained, adjusted or eliminated.

More specifically, by turning on the appropriate spindle motor coils with current 206 (e.g., DC), resistive heating takes place but the motor is not spun because no current switching is employed. Moreover, supplying low current 206 levels to actuator coils can provide heating. Alternatively, a selective drive integrated circuit (IC) can also be powered to heat the circuit. A commercially available resistive heater could also be mounted to HDD 209.

In an alternate embodiment, the hard disk drive temperature control component 207 can be implemented as a solid-state Peltier device. It should be appreciated that a Peltier device is capable of removing or adding heat to a hard disk drive when voltage is supplied across the device. Peltier devices have the advantage of providing the capacity to both heat and cool using a single device. This is accomplished through a simple reversing of the voltage across the device terminals. In an alternate embodiment, other suitable temperature adjusting components can be used.

Operation

In exemplary embodiments, HDD temperature control system 200 may find utility in a diverse range of applications, e.g., including but not limited to automotive, aerospace, and computer system applications. In such applications, there is a wide range of temperature conditions to which an associated HDD (e.g., 209) may be subjected. For example, in the automotive context, on board HDD (e.g., 209) can be subjected to temperatures that range from near arctic to sub-tropic.

In one embodiment, when the temperature of the environment in which a vehicle (or computer system) that includes an on board HDD 209 is located presents very low temperatures and the temperature of the on board HDD 209 itself falls below a specified temperature (or range of temperatures), HDD temperature control system 200 will act to raise the temperature of the HDD 209. Conversely, when the temperature of the environment in which a vehicle (or computer system) that includes an on board HDD 209 is located presents very high temperatures and the temperature of HDD 209 itself rises above a specified temperature (or range of temperatures), HDD temperature control system 200 will act to lower the temperature of HDD 209.

HDD temperature monitor 203 monitors the temperature of HDD 209 in an ongoing manner. Moreover, HDD temperature monitor 203 generates measures of the existing temperature or (change in the temperature) of HDD 209 that it detects. The measures of the existing temperature or (change in the temperature) of HDD 209 are made accessible to HDD temperature manager 205. In one embodiment, when the temperature of the HDD 209 rises above or falls below a specified temperature (or range of temperatures), the HDD temperature manager 205 acts (by controlling current 206 level) to control the temperature of HDD 209 via HDD temperature control component 207 based on the accessed measure of the temperature or (change in the temperature) of HDD 209.

Exemplary Operations in Accordance with Embodiments of the Present Invention

Figure 3:
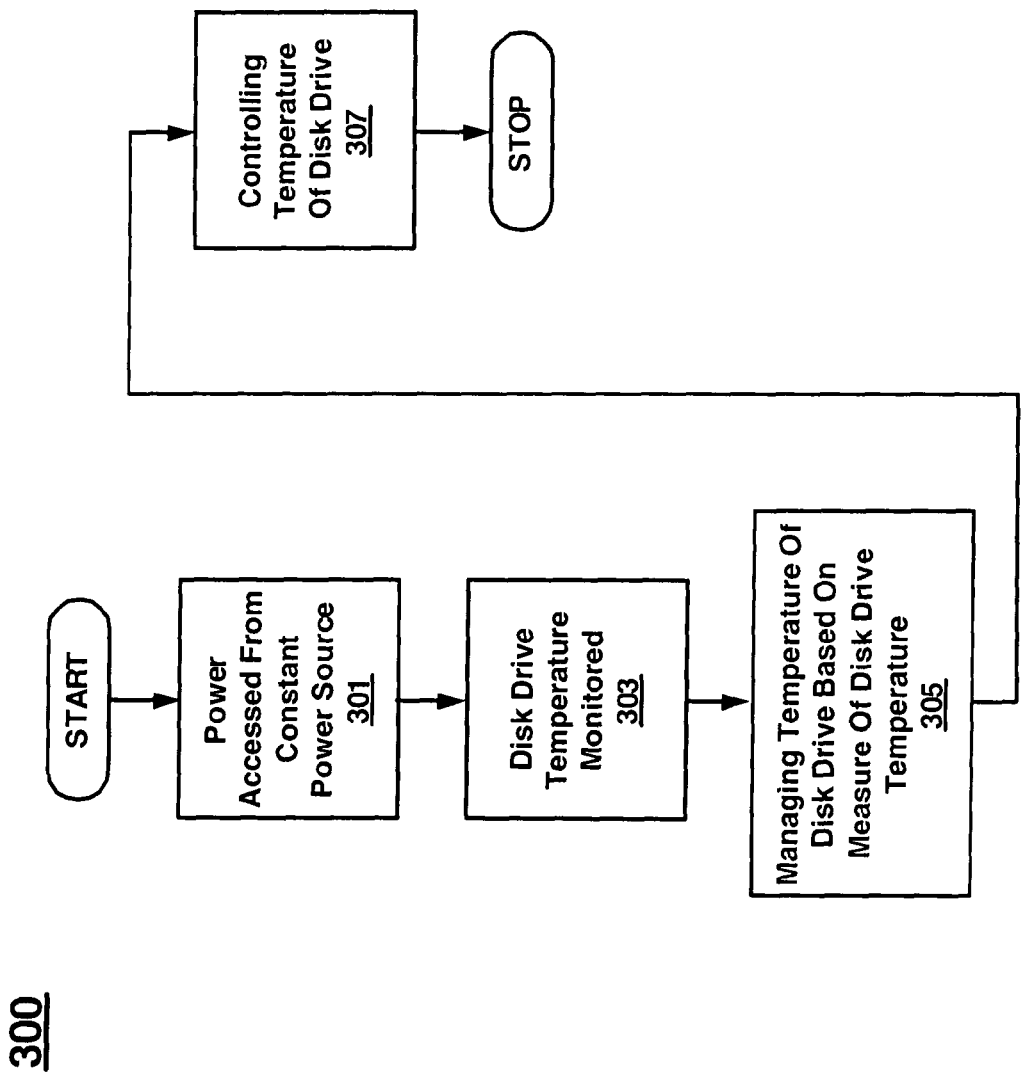
FIG. 3 is a flowchart of steps performed in a process of HDD internal temperature control in accordance with one embodiment of the present invention.

FIG. 3 is a flowchart 300 of steps performed in a process of HDD internal temperature control in accordance with one embodiment of the present invention. Although specific steps are disclosed in the flowchart, such steps are exemplary. That is, the present invention is well suited to performing various other steps or variations of the steps recited in FIG. 3.

At step 301, power is continuously accessed from a continuously available power source. In one embodiment, a power accessor (e.g., 201 in FIG. 2A) may be employed to continuously access power from a continuously available power source (e.g., battery etc.). The power that is accessed may be used to power a HDD temperature manager (e.g., 205 in FIG. 2A). In one embodiment, the power accessor (e.g., 201 in FIG. 2A) may be included as a part of the HDD temperature controller.

At step 303, the temperature of the HDD is monitored and a measure of the temperature detected is made accessible to a HDD temperature monitor (e.g., 203 in FIG. 2A). In one embodiment, a HDD temperature monitor (e.g., 203 in FIG. 2A) may be employed to monitor the temperature of HDD (e.g., 209 in FIG. 2A). In addition, the temperature monitor (e.g., 203 in FIG. 2A) may be employed to generate a measure of the temperature or the change in temperature of the HDD (e.g., 209 in FIG. 2A). In one embodiment, the HDD temperature monitor (e.g., 203 in FIG. 2A) is configured to respond to the temperature or the changes in the temperature of the HDD (e.g., 209 in FIG. 2A) by generating signals/data that reflect the temperature or changes in the temperature of the HDD (e.g., 209 in FIG. 2A).

At step 305, the temperature of the HDD is managed based on an accessed measure of the temperature of the HDD. In one embodiment, a HDD temperature manager (e.g., 205 in FIG. 2A) manages the temperature of (the addition or removal of heat to/from) the hard disk drive (e.g., 209 in FIG. 2A) based on an accessed measure of the temperature or change in temperature of the HDD (e.g., 209 in FIG. 2A). In one embodiment, a HDD temperature manager (e.g., 205 in FIG. 2A) may access a measure of the temperature or change in temperature of HDD (e.g., 209 in FIG. 2A) from a HDD temperature monitor (e.g., 203 in FIG. 2A). Based on the measure of the temperature or change in temperature of the HDD (e.g., 209 in FIG. 2A) that is accessed, the HDD temperature manager (e.g., 205 in FIG. 2A) may act to maintain, raise or lower the temperature of HDD (e.g., 209 in FIG. 2A).

At step 307, the temperature of the HDD is controlled. In one embodiment, a HDD temperature control component (e.g., 207 in FIG. 2A) adds or removes heat (or does not add or remove heat) to or from the HDD (e.g., 209 in FIG. 2A) based upon signals that are received (or not received) from HDD temperature manager (e.g., 205 in FIG. 2A). In one embodiment, in this manner the HDD temperature control component (e.g., 207 in FIG. 2A) functions to maintain the temperature of HDD (e.g., 209 in FIG. 2A) within a specified range.

As noted above with reference to exemplary embodiments thereof, a disk drive internal temperature control system is disclosed. The internal temperature control system includes a disk drive temperature monitor for determining a temperature of the disk drive and for providing a measure of the temperature of the disk drive and a disk drive temperature manager for managing the temperature of the disk drive based on the measure of the temperature of the disk drive. A temperature control component controls the temperature of the disk drive.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A disk drive internal temperature control system, comprising:
    a disk drive temperature monitor for determining an internal temperature of said disk drive and for providing a measure of said temperature of said disk drive, said temperature monitor configured to operate within said disk drive;
    a disk drive temperature manager for managing said temperature of said disk drive based on said measure of said temperature of said disk drive, said disk drive temperature manager configured to operate within said disk drive; and
    a temperature control component configured to operate within said disk drive for controlling said internal temperature of said disk drive wherein said temperature control component initiates cooling of said disk drive in response to said disk drive reaching a first temperature and said temperature control component initiates heating of said disk drive in response to said disk drive reaching a second temperature.

2. The temperature control system of claim 1 wherein said disk drive temperature manager comprises:
    a power accessor for continuously accessing power from a continuously available power source to power said temperature control system.

3. The temperature control system of claim 1 wherein said disk drive temperature monitor comprises a temperature sensor.

4. The temperature control system of claim 1 wherein said disk drive temperature manager comprises a thermostat.

5. The temperature control system of claim 1 wherein said temperature control component is selected from the group that includes a Peltier device, a selective drive integrated circuit (IC), and resistive heater.

6. The temperature control system of claim 1 wherein said internal components of said disk drive are selected from the group that includes spindle motor coils and actuator coils.

7. The temperature control system of claim 1 wherein said disk drive temperature monitor is mounted onto said disk drive.

8. A disk drive internal temperature control system, comprising:
    means for monitoring a temperature of said disk drive and for providing a measure of said temperature of said disk drive, said means for monitoring configured to operate within said disk drive;
    means for managing said temperature of said disk drive based on said measure of said temperature of said disk drive said means for managing configured to operate within said disk drive; and
    means for controlling said temperature of said disk drive wherein a temperature control component initiates cooling of said disk drive in response to said disk drive reaching a first temperature and said temperature control component initiates heating of said disk drive in response to said disk drive reaching a second temperature wherein said means for controlling said temperature of said disk drive are configured to operate within said disk drive.

9. The temperature control system of claim 8 wherein said means for managing said temperature of said disk drive based on said measure of said temperature comprises:
    means for continuously accessing power from a continuously available power source to power said temperature control system.

10. The temperature control system of claim 8 wherein said means for monitoring a temperature of said disk drive and for providing a measure of said temperature of said disk drive comprises a temperature sensor.

11. The temperature control system of claim 8 wherein said means for managing said temperature of said disk drive based on said measure of said temperature of said disk drive comprises a thermostat.

12. The temperature control system of claim 8 wherein said means for controlling said temperature is selected from the group that includes a Peltier device, a selective drive integrated circuit (IC), and resistive heater.

13. The temperature control system of claim 8 wherein said internal components of said disk drive are selected from the group that includes spindle motor coils and actuator coils.

14. The temperature control system of claim 8 wherein said means for monitoring said temperature is mounted onto said disk drive.

15. A hard disk drive (HDD) with an internal temperature control system for internal control of disk drive temperature, comprising:
- a HDD;
- a HDD temperature monitor disposed within said HDD for determining a temperature of said HDD and for providing a measure of said temperature of said HDD;
- a HDD temperature manager disposed within said HDD for managing said temperature of said HDD based on said measure of said temperature of said HDD; and
- a temperature control component disposed within said HDD for controlling said temperature of said HDD wherein said temperature control component initiates cooling of said HDD in response to said HDD reaching a first temperature and said temperature control component initiates heating of said HDD in response to said HDD reaching a second temperature.

16. The temperature control system of claim 15 wherein said HDD temperature manager comprises:
- a power accessor for continuously accessing power from a continuously available power source to power said temperature control system.

17. The temperature control system of claim 15 wherein said HDD temperature monitor comprises a temperature sensor.

18. The temperature control system of claim 15 wherein said HDD temperature manager comprises a thermostat.

19. The temperature control system of claim 15 wherein said temperature control component is selected from the group that includes a Peltier device, a selective drive integrated circuit (IC), and resistive heater.

20. The temperature control system of claim 15 wherein said internal components of said HDD are selected from the group that includes spindle motor coils and actuator coils.

21. The temperature control system of claim 15 wherein said HDD temperature monitor is mounted onto said HDD.

* * * * *